United States Patent [19]

Asako

[11] Patent Number: 4,624,552

[45] Date of Patent: Nov. 25, 1986

[54] MAGNIFICATION CONTROL DEVICE

[75] Inventor: Makoto Asako, Tokyo, Japan

[73] Assignees: Casio Computer Co., Ltd.; Casio Electronics Manufacturing Co., Ltd., both of Tokyo, Japan

[21] Appl. No.: 735,133

[22] Filed: May 17, 1985

[30] Foreign Application Priority Data

May 22, 1984 [JP] Japan ................................ 59-103396

[51] Int. Cl.⁴ ................................................ G03B 27/52

[52] U.S. Cl. .................................... 355/55; 355/14 C; 355/61

[58] Field of Search ................... 355/55, 57, 61, 14 C, 355/14 R

[56] References Cited

U.S. PATENT DOCUMENTS 4,270,173 5/1981 Suttler .............................. 355/61 X

*Primary Examiner*—Richard A. Wintercorn

*Attorney, Agent, or Firm*—Sandler & Greenblum

[57] ABSTRACT

The present invention provides a magnification control device for use to a copying machine in which the area magnification as well as the linear magnification can be set by the operator. The linear magnification can be converted to the area magnification and also, the area magnification can be converted to the linear magnification. The area magnification is determined based on the area of the copying paper and that of the original.

6 Claims, 5 Drawing Figures

MAGNIFICATION CONTROL DEVICE

BACKGROUND OF THE INVENTION

The present invention relates to a copying machine capable performing a stepless changing of its copying magnification and, more particularly, it relates to a magnification control device capable of setting the magnification in the form of linear and area magnifications.

When the magnification is changed to meet the size of the copying paper, plural fixed magnification keys are provided to set the magnification to meet the change in the size of the copying paper which is done, for example from size A3 to size A4, from size A4 to size B4, and from size B4 to A3. However, the copying machines which use a stepless process to change their magnification are on the market these days and their magnification setting is attained by inputting an optional numeral value by means of numeral ten keys or the like. When reduction is done from size A3 to size A4, for example, the numeral value which represents the length ratio of the sides between sizes A3 and A4 is inputted to set the magnification. Since the length ratio is $\sqrt{2}$:1, the numeral value which is to be inputted by the ten keys is 0.707, which is called linear magnification.

On the other hand, the area ratio between sizes A3 and A4 is 2:1, which is equal to 0.5 and this 0.5 is called area magnification. When reduction from size A3 to size A4 is denoted by the linear magnification, it is 0.707 and when it is represented by the area magnification, it is 0.5. Conventionally, the linear magnification was employed by all copying machines.

When the operator operates the stepless magnification copying machine, he must input a numeral value by means of the ten keys, usually keeping the linear magnification in his mind. It is, however, difficult for the ordinary operators to conceptually convert enlargement and reduction of copying paper in the form of linear magnification. When they want to reduce the size of the copying paper to a size a little smaller in area ratio than $\frac{1}{2}$, for example, they cannot easily or quickly obtain the desired area ratio by inputting its numeral value which is represented by the linear magnification.

SUMMARY OF THE INVENTION

The object of the present invention is therefore to provide a magnification control device for use with the stepless magnification copying machine and is capable of setting magnification in the form of linear and area magnifications and inputting any copying sizes according to the needs of its users.

According to a feature of the present invention, there is provided a magnification control device for use with the magnification variable copying machine characterized in that magnification is set on the basis of area magnification.

DETAILED DESCRIPTION OF THE PREFERRED EMBODIMENT

Figure 1:
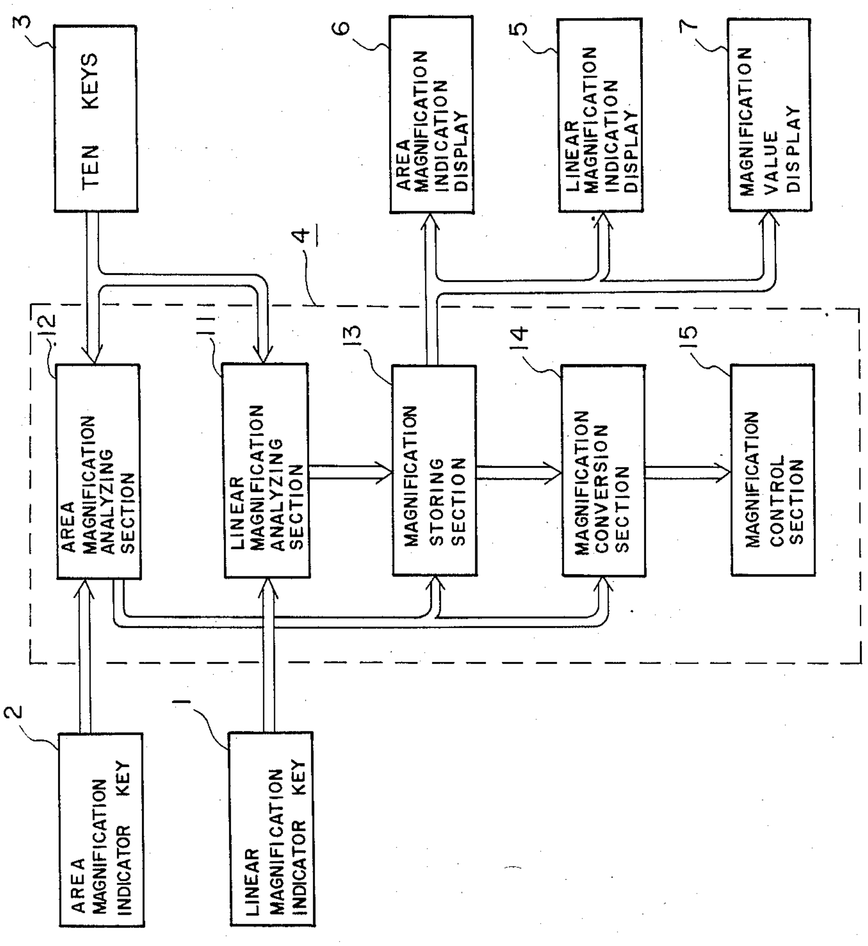
FIGS. 1A and 1B are respectively circuit diagrams showing an embodiment of the magnification control device according to the present invention.
Figure 1A:
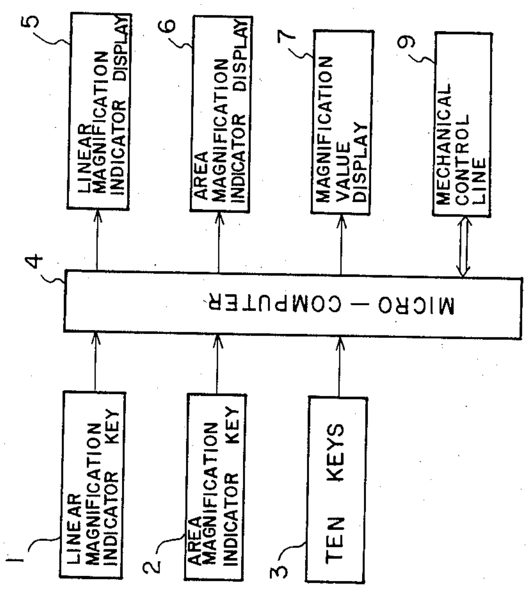

FIGS. 1A and 1B are circuit block diagrams showing an embodiment of the magnification control device of the present invention, in which linear and area magnification indicator keys 1 and 2, and ten keys 3 are connected to a micro-computer 4 and signals inputted to these keys are introduced into the micro-computer 4. Linear and area magnification indicator displays 5 and 6, and a magnification value display 7 are also connected to the micro-computer 4 from which control signals are outputted to these displays. The micro-computer 4 is also connected to a mechanical control line 9 which electrically controls the control system, stepless magnification system and the line which are needed to achieve a copying operation.

FIG. 1B is a circuit block diagram showing the magnification control device and including a circuit diagram in the micro-computer 4. When a magnification is indicated by the linear or area magnification indicator key 1 or 2, a signal which represents the magnification is inputted to a linear or area magnification analyzing section 11 or 12 and the data which has been inputted to the linear magnification analyzing section 11 is stored in a magnification storing section 13 and then converted to an area magnification at a magnification conversion section 14. At this time when area magnification is indicated, it is processed without being converted to the area magnification. After the linear magnification is converted to the area one, the converted value is displayed by the display 5 when linear magnification is intended, but it is displayed by the display 6 when area magnification is intended. As control at the time of carrying out the copying operation is made, usually using linear magnification, conversion control is achieved by a conversion control section 15 after area magnification is converted to linear one when area magnification is intended.

Figure 2:
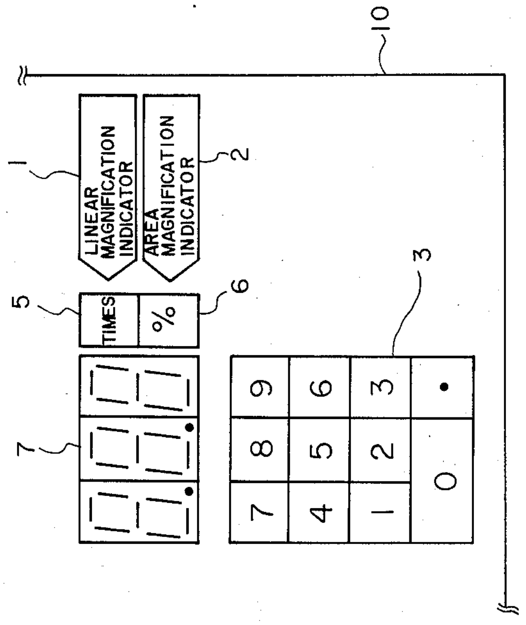
FIG. 2 shows a display panel on the magnification control device according to the present invention.

FIG. 2 is a view showing an operation panel. Input means such as the linear and area magnification indicator keys 1, 2 and ten keys 3 are arranged on the operation panel 10, as shown in FIG. 2. Display means such as the linear and area magnification indication displays 5, 6 and magnification value display 7 are arranged on the operation panel 10 as well.

When the magnification mode which the operation intends is linear magnification, the linear magnification indicator display 5 is turned on while the area magnification indicator display 6 is turned off by pushing the linear magnification indicator key 1. In the case where area magnification value is displayed on the magnification value display 7, numeral value is displayed in the form of linear magnification value converted. The numeral value on the magnification value display 7 can be changed by the ten keys 3. Thereafter, copying operation is achieved according to the numeral value on the magnification value display 7 and the magnification on the magnification mode indication display 5 by pushing the copy start key (not shown).

When the operator intends area magnification, the area magnification indicator display 6 is turned on by pushing the area magnification indicator key 2, thereby enabling the copying operation to be achieved at a desired area magnification.

Figure 3A:
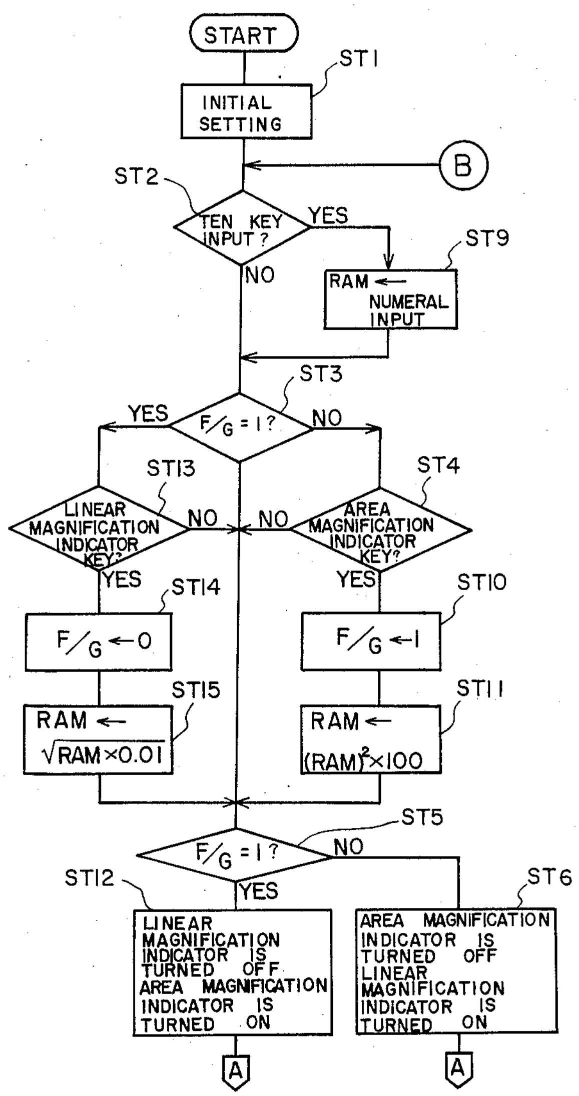
FIGS. 3A and 3B are flow charts for operating the embodiment of the present invention.
Figure 3B:
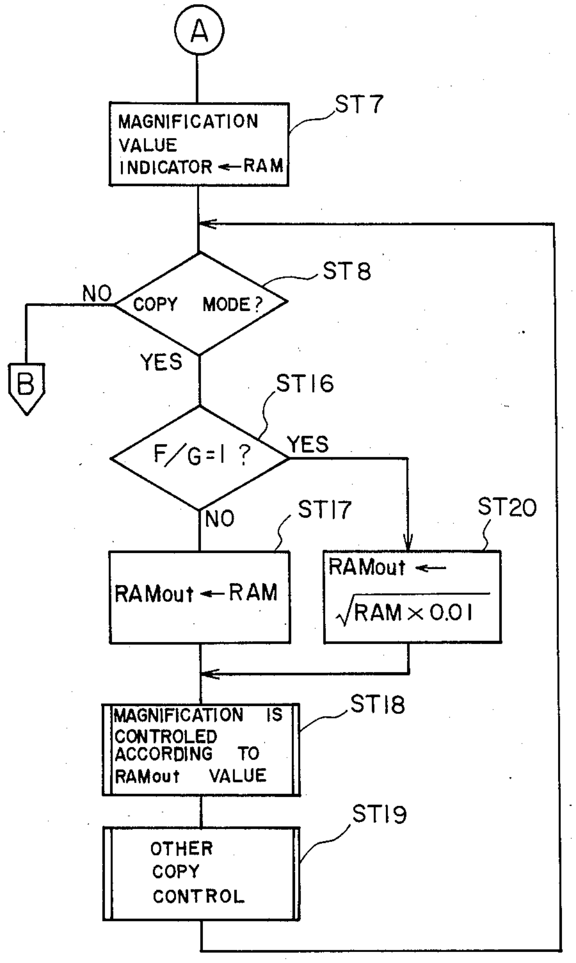

Control process in the micro-computer 4 will be described, referring to a flow chart in FIGS. 3A and 3B.

Necessary initial conditions are set in the microcomputer 4 at the time of turning on the copying machine. The mechanical control line 9 is made operative to meet the necessary initial conditions and a value of 1.00 is inputted to a random access memory (which will be hereeinafter referred to as RAM) in the micro-computer 4 to set real size magnification mode at an initial setting. Flag is set to perform an initial setting such as a reset (F/G=0) which represents linear magnification mode (ST 1). It is then recognized whether or not an input is done by the ten keys 3 (ST 2) and when the answer is NO, it is recognized whether or not the flag (F/G) is equal to 1 (ST 3). Since F/G=0 at the time of initial setting, the process advances to ST 4 and it can be recognized whether or not an input is applied to the area magnification indicator key 2. When the answer is NO at ST 4, it can be recognized whether or not F/G =1 (ST 5). Since F/G =0 this time, the area magnification indicator display 6 is turned off while the linear magnification indicator display 5 is turned on (ST 6).

The process advances to ST 7 and 1.00 time is displayed by the magnification display 7 in accordance with the data stored in the RAM.

It can then be recognized whether or not the machine is under copy mode (ST 8) and when the answer is NO, the process returns to ST 2 and the above-described ST 2 - ST 8 are repeated.

When the magnification value is to be changed, a value to which the magnification is changed is inputted by the ten keys 3 and the process advances from ST 2 to ST 9, thereby enabling the changed magnification value to be inputted to the RAM.

When the answer is YES at ST 4, that is, when the area magnification indicator key is pushed, the process advances to ST 10 and the flag is set equal to 1 (F/G=1). Then, the process advances to ST 11 and the value on the RAM is converted to an area magnification value $\{RAM \leftarrow (RAM)^2 \times 100\}$. The converted value is inputted to the RAM and the process returns to ST 5. Since F/G=1, the process advances to ST 12 and the linear magnification indicator display 5 is turned off while the area magnification indicator display 6 is turned on, thereby displaying the value in the RAM which has been converted to the area magnification value. Therefore, 100% is displayed on the magnification value display 7 and area magnification indicator display 6.

The process is repeated in a loop which consists of ST(s) 8, 2, 3, 4 and 5, and when the linear magnification indicator key 1 which changes linear magnification value is pushed, the process advances from ST 13 to ST 14. The flag is reset (F/G=0) and the process advances to ST 15. The value in the RAM is converted to a linear magnification value $\{RAM \leftarrow \sqrt{RAM \times 0.01}\}$ and inputted to the RAM and the process returns to ST 5. Since F/G=0 this time, the process returns to ST 6 again and the area magnification indicator display is turned off while the linear magnification indicator display is turned on (ST 7), thereby enabling the value in the RAM which has been converted to the linear magnification value to be displayed on the magnification value display 7 and linear magnification indicator display 5. Namely, 1.00 time is displayed. Thereafter, the process is repeated in a loop which consists of ST 2 through ST 7.

When copy mode is started by the copy start key (not shown), the answer is YES at ST 8 and the flag (F/G=1) is recognized. When the answer is NO, the value in the RAM is transferred to the output of the RAM (ST 17) and the process advances to ST 18. Control for changing magnification is made according to the output value of the RAM at ST 18 and the other copy control for the mechanical control system 9 is conducted (ST 19). The process then returns to ST 8.

When area magnification is displayed before copy mode starts, the process advances from ST 16 to ST 20 and the value displayed is converted to a linear magnification value and inputted to the RAM. The processes at ST(s) 18 and 19 are done according to this data and the process returns to ST 8.

When the micro-computer 4 and display panel 10 are controlled as described above, the operator can input magnification values in the form of linear and area magnifications without conducting any magnification input value conversion which was needed conventionally, and anybody can input magnification values with ease and reliability.

As described above, the present invention can provide a stepless copying machine capable of setting area and linear magnifications to meet user's needs; making it unnecessary to carry out calculations relating to area ratio conversion and the like which were difficult with conventional machines.

What is claimed is:

1. A magnification control device adapted to be used with an electrophotographic copying apparatus, said magnification control device being adapted to set the copying magnification of said copying apparatus in a stepless fashion, said device comprising means for inputting a desired copying magnification, a magnification mode selector comprising means for indicating whether the desired copying magnification which has been inputted by said input means should be treated as a linear copying magnification or an area copying magnification, a memory comprising means for storing the desired copying magnification which has been inputted by said input means, an arithmetic processor which is responsive to a mode indicated by said magnification mode selector, said arithmetic processor comprising means for converting the desired copying magnification stored in said memory from a linear magnification to an area magnification or from an area magnification to a linear magnification, a display comprising means for displaying the value of the converted magnification which has been obtained by said arithmetic processor as a result of converting the desired copying magnification, and control means for determining an actual copying magnification in response to said converted magnification obtained by said arithmetic processor.

2. A magnification control device in accordance with claim 1 wherein said said control means comprise means for determining the actual copying magnification in response to receipt of a copying initiation signal.

3. A magnification control device in accordance with claim 1 wherein said control means comprises means for determining said actual copying magnification as a linear magnification after an inputted desired copying magnification has been indicated as an area copying magnification by an indicator on said magnification mode selector and has been converted to a corresponding linear magnification.

4. A magnification control device in accordance with claim 1 in combination with an electrophotographic copying apparatus.

5. A magnification control device in accordance with claim 1 further comprising means for changing the magnification on said display from a linear magnification to an area magnification.

6. A magnification control device in accordance with claim 1 further comprising means for changing the magnification on said display from an area magnification to a linear magnification.

* * * * *